(12) United States Patent
Ngoi et al.

(10) Patent No.: US 6,320,665 B1
(45) Date of Patent: *Nov. 20, 2001

(54) ACOUSTO OPTIC SCANNING LASER VIBROMETER FOR DETERMINING THE DYNAMIC PROPERTIES OF AN OBJECT

(76) Inventors: Bryan Kok Ann Ngoi, Nanyang Technological University, School of Mechanical and Production Engineering, Nanyang avenue, Singapore (SG), 639798; Krishnan Venkatakrishnan, Blk 101, #05-170, Jurong East St-13, Singapore (SG), 600101

(*) Notice: Subject to any disclaimer, the term of this patent is extended or adjusted under 35 U.S.C. 154(b) by 0 days.

This patent is subject to a terminal disclaimer.

(21) Appl. No.: 09/350,901

(22) Filed: Jul. 12, 1999

Related U.S. Application Data

(63) Continuation-in-part of application No. 09/222,731, filed on Dec. 29, 1998, now Pat. No. 6,271,924.

(51) Int. Cl.[7] ........................................ G01B 9/02
(52) U.S. Cl. .................................. 356/485; 356/487
(58) Field of Search ............................... 356/485, 486, 356/487, 489, 492, 495, 511

(56) References Cited

U.S. PATENT DOCUMENTS

| 4,298,283 | * 11/1981 | Makosch et al. ................... 356/495 |
|---|---|---|
| 4,554,836 | 11/1985 | Rudd . |
| 4,762,417 | * 8/1988 | Wu et al. ............................ 356/491 |
| 5,394,233 | 2/1995 | Wang . |
| 5,481,360 | * 1/1996 | Fugita ................................. 356/495 |
| 5,694,216 | * 12/1997 | Riza .................................... 356/489 |
| 5,838,439 | 11/1998 | Zang et al. . |
| 5,883,715 | 3/1999 | Steinlechner et al. . |

* cited by examiner

Primary Examiner—Samuel A. Turner
(74) Attorney, Agent, or Firm—Burns, Doane, Swecker & Mathis, LLP

(57) ABSTRACT

An apparatus and method for using an acousto optic scanning laser vibrometer for measuring a dynamic parameter of micro and macro components is disclosed. A coherent source of a laser beam of single wavelength and of stabilized frequency is split into two orthogonal polarized beams. One of the beams strikes the surface of investigation and gets reflected back, and the other polarized beam impinges on the reference surface and gets reflected back. The beam reflected from the surface of investigation and the beam from the reference surface are combined, thereby causing them to interfere. At least one photo detector is positioned at the point of interference. The photo detector output signals are input to a signal processor or phase meter to obtain the dynamic parameter information. Information is provided that is based on the phase shift between the beam striking on the object of investigation and the beam striking the reference surface due to the difference in the optical path. The information provided relates to the dynamic parameters of the object under investigation.

34 Claims, 10 Drawing Sheets

ACOUSTO OPTIC SCANNING LASER VIBROMETER FOR DETERMINING THE DYNAMIC PROPERTIES OF AN OBJECT

The present application is a continuation-in-part of U.S. patent application Ser. No. 09/222,731, filed on Dec. 29, 1998, entitled "Noncontact Acousto Optic Scanning Laser Vibrometer", now U.S. Pat. No. 6,271,924.

FIELD OF THE INVENTION

The present invention relates to a method and apparatus for the dynamic measurement of micro and macro features using an acousto optic scanning means.

BACKGROUND OF THE INVENTION

Non-contact vibration measurement using laser doppler vibrometry is a well-established technique. The laser doppler vibrometry method uses an interferometer to measure the doppler frequency shift induced by the vibration of the object. In order to measure the vibration of the object, the measurement beam strikes the object to be measured and interferes with a reference beam. The resulting frequency shift induced in the interference beam is the vibration of the target surface. The measured vibration signal is the average vibration of the object over the entire beam diameter of the measurement beam striking the object.

U.S. Pat. No. 4,554,836 (Rudd), U.S. Pat. No. 5,394,233 (Wang), U.S. Pat. No. 5,838,439 (Zang et al.), U.S. Pat. No. 5,883,715 (Steinlechner et al.), etc., describes single point vibration measurement using laser doppler vibrometry. Some applications require scanning the beam over the object surface in order to measure the dynamic parameter of the object over an area rather than at a single point for better analysis. Moving the object stage in the X-axis and Y-axis and keeping the beam at a fixed point will allow measurement of the vibration over an area. But such a means for scanning the beam over the object is limited by the accuracy of the moving stages, and in most application it is not possible to move the object. Moreover, the motion of the stage creates vibration and increases the noise. In which case, the object of measurement should be fixed, and the beam needs to scan from one point to the next.

Laser doppler vibrometer can also be used to measure the flying height, i.e., the distance between the slider head and the disk surface in a hard disk. The flying height is a critical parameter and needs to be measured accurately in order to assure optimal performance. Methods such as capacitance, monochromatic interferometry, and white light interferometry are other methods which can also be applied to the measurement of flying height. All the interferometric measurement techniques involve measurement of flying height at a single point or by scanning the beam by moving the hard disk in the X-axis and the Y-axis. This process will not lead to accurate measurement of flying height due to the error induced by the mechanical movement of the hard disk. Also, the measured flying height is the average of the overall flying height of the area of the measurement spot, which is rather large in all these system. Therefore, the smaller the spot size the more accurate is the measured flying height.

SUMMARY OF INVENTION

The first preferred embodiment of the present invention is a method and apparatus for the measurement of dynamic parameters of micro and macro features. The disclosed invention includes a beam spatial filter to filter the laser beam profile. The filtered beam passes through a diaphragm or a slot to further improving the beam quality. This process of beam filtering will achieve a small and uniform profile spot.

The disclosed invention consists of non-mechanical scanning means using an acousto optic deflector. Acousto optic deflectors for X- and Y-axes scanning are placed in both the measurement and the reference path of the laser beam, thereby scanning the reference and the measurement beams simultaneously. The two X-axis and Y-axis acousto optic deflectors in the reference and the measurement path are driven by the common driver for X-axis and Y-axis, respectively. The acousto optic deflectors in combination with the scanning lens, scan the laser beam along the surface of the target along the X-Y plane. The position of the optical components, acousto optic deflectors and scanning lens are such that the scanning measurement and reference beam interfere automatically at all the scanning points, and they are focused on to a stationary photodetector. Further modification of the first preferred embodiment of the present invention includes using common beam splitters for producing the measurement and the reference interference signal.

The second embodiment of the present invention is the measurement of flying height. The reference beam is made to scan the disk surface, and the measurement beam is made to scan the slider head surface. Thus, the relative height between the disk surface and the slider head, i.e., the flying height, is measured. Further modification of the present invention includes use of common beam splitters for producing the measurement and the reference interference signals as in the previous embodiment.

The third embodiment of the present invention includes the modification of the previous embodiment by using two scanning lenses, one for the scanning beam on the slider surface, and the other for the scanning beam on the disk surface. This will achieve the same spot size on both the slider head and the disk surface, which is not possible by using a common scanning lens for both beams. This process will lead to more accurate results. A spherical concave reflector can be used to reflect the reference scanning beam in the same path as the input scanning beam.

DETAILED DESCRIPTION OF THE INVENTION

First Embodiment of the Present Invention

Figure 1:
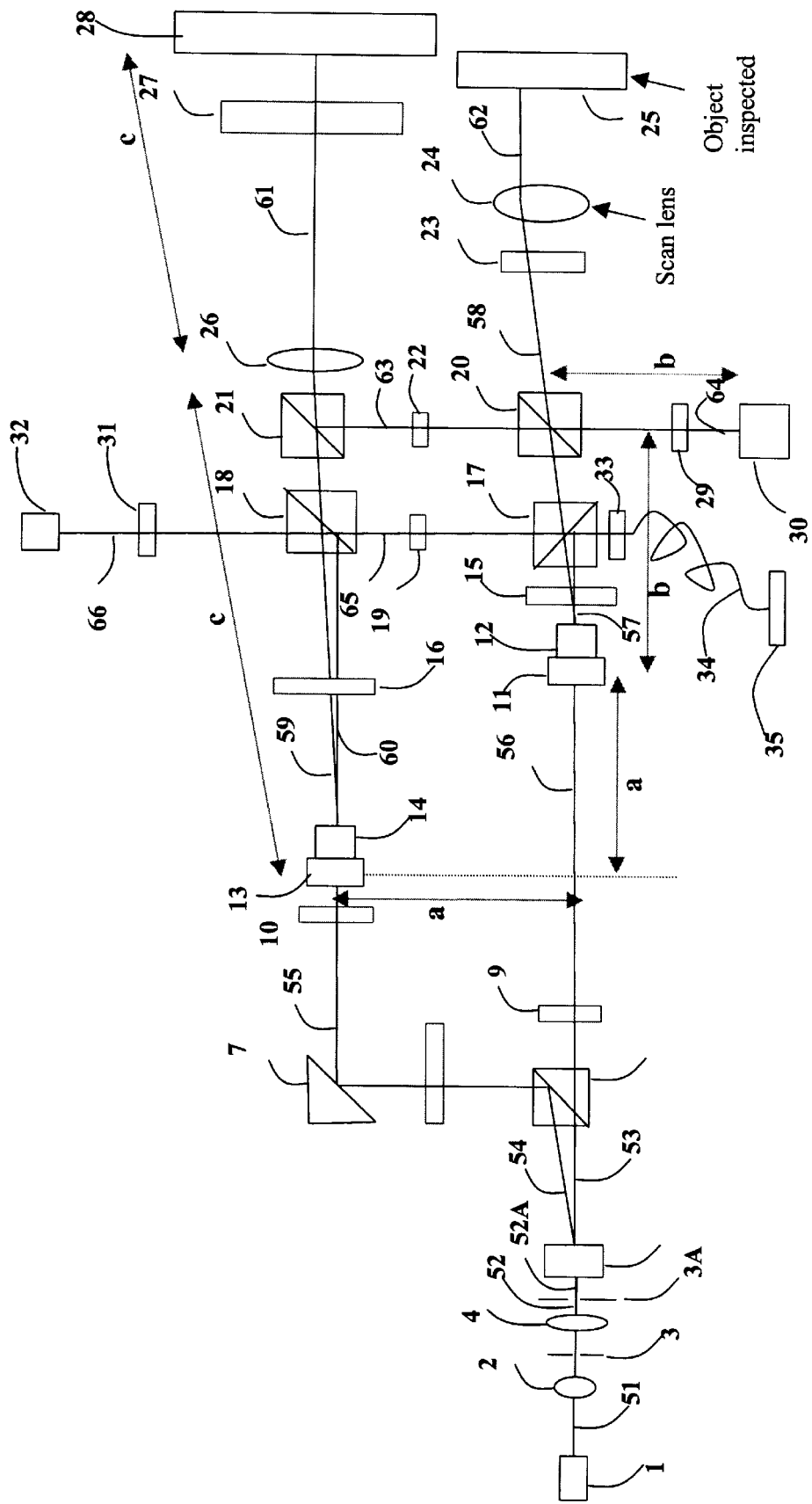
FIG. 1 is a drawing of the overall optical system for the non-contact acousto optic scanning system for dynamic parameters measurement.

Referring to FIG. 1, the preferred embodiment of the present invention employs a laser source 1, which is preferably a He—Ne laser source. The laser beam 51 preferably passes through a beam spatial filtering mechanism, which is comprised of preferably a focusing lens or objective lens 2, a pin hole 3 and a collimating or focusing lens 4. The spatial filtering mechanism includes preferably the collimating or focusing lens 2. The circular pin hole or slot 3 includes a hole diameter of preferably 1–1.5 times the diameter of the focal spot diameter of the laser beam focused by the lens 2, which is a diameter of the portion of the laser beam at which the beam intensity becomes preferably $1/e^2$ of its peak intensity. This arrangement is preferably to eliminate the noise component in the laser beam 51. Thus the noise generated due to the random fluctuations from the intensity profile of the laser beam is preferably eliminated. This process of filtering may result in improving the spot size of the laser beam obtained on passing through the scanning lens 24 at the focal point of the scanning lens 24. The pinhole or slot 3 is placed preferably at the focal point of the lens 2. The collimating or focusing lens 4 is placed preferably at a distance equal to the focal length of the lens 4 from the slot 3. This mechanism may also result in expanding the laser beam 51. In order to expand the diameter of the laser beam 52 to twice the diameter of the laser beam 51, the focal length of the lens 4 is preferably twice the focal length of the lens 2. Therefore, the expansion ratio of the beam 52 to the beam 50 is equal to the ratio of focal length of the lens 4 to the lens 2. In general, expansion ratio " " of the ultra short laser pulse is given by =b/a where "b" is the focal length of the lens 4 and "a" is the focal length of the lens 2. A portion of the total intensity of the laser beam may be lost by the filtering mechanism.

The filtered and expanded beam 52 may preferably pass through a slot or diaphragm 3A which has a hole diameter of preferably 1–1.5 times the diameter of the laser beam 52 at which its intensity is preferably $1/e^2$ of its peak intensity. This may further enhance the beam quality by eliminating the peripheral portion of the laser beam. The filtered beam 52A then passes through a acousto optic modulator 5 which is preferably positioned such that the laser beam 52A is incident on the acousto optic crystal in the acousto optic modulator 5 at the Braggs angle $\theta_B$ of the crystal.

The zero order beam 53 and the first order beam 54 pass through a beam splitter 6, which is preferably a polarizing beam splitter. The zero order beam 53 then passes through a wave plate 9, which is preferably a half wave plate to change the polarization state of the laser beam to suit the requirement of the acousto optic deflector 11. Similarly, the first order beam 54 then passes through wave plates 8 and 10, which are preferably half wave plates to change the polarization state of the laser beam to suit the requirement of the acousto optic deflector 13. The beam 58 then passes through the acousto optic deflectors 11 and 12. The first order beam 58 from the acousto optic deflectors 11 and 12 is deflected in both the X-axis and Y-axis. The beam 55 then passes through the acousto optic deflectors 13 and 14. The first order beam 59 from the acousto optic deflectors 13 and 14 is deflected in both the X-axis and Y-axis.

The polarization state of the first order beam 58 is changed by the wave plate 15, which is preferably a half wave plate so that the beam 58 passes through the beam splitters 17 and 20. The zero order beam 57 from the acousto optic deflector 12 is deflected by the beam splitter 17 and passes through a wave plate 33, which is preferably a quarter wave plate. The beam strikes the mirror or a reference surface 35 and is reflected back in the same path. The reflected beam 65 then interferes with the zero order beam 60 from the acousto optic deflector 14 by the beam splitter 18 and the polarizer 31. The interference beam 66 then strikes the photo detector 32, which acts as a reference signal.

The first order scanning beam from the acousto optic deflectors 11 and 12 passes through the quarter wave plate 23 and a scan lens 24, which is preferably a F-Theta lens, telecentric lens or a confocal microscopy lens. The beam 62 is then focused on to the target surface 25 and reflected back along the same path.

Similarly, the first order scanning beam from the acousto optic deflectors 13 and 14 pass through the quarter wave plate 27 and collimating or focusing lens 26. The beam 61 is focused on to the reference surface, which is preferably a super mirror 28, which reflects the beam along the same path. The distance between the lens 26 and the center of the acousto optic deflectors 13 and 14 is equal to the focal length of the lens 26. Also, mirror 28 is at the focal distance from the lens 26.

The reflected beam from the mirror 28 is deflected by the beam splitter 21 and the polarization of the beam 63 is shifted by the half wave plate 22. The beam interferes with the reflected beam from the object surface by the beam splitter 20 and the polarizer 29. The interfered beam 64 strikes the photo detector 30, and acts as the measuring signal.

Figure 2:
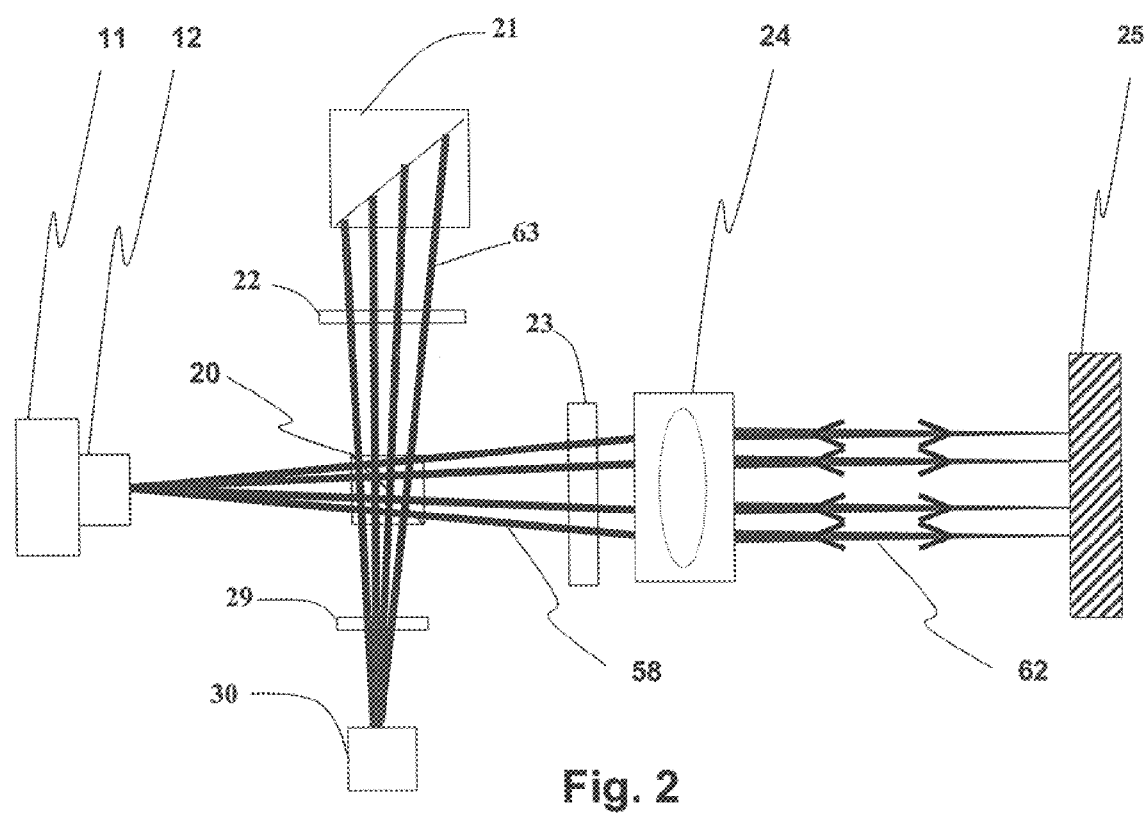
FIG. 2 is a drawing showing the working principle of the scanning lens along with the acousto optic deflector.

Referring to the FIG. 1, the distance between the acousto optic deflectors 11 and 12 are positioned at a distance "a" from the acousto optic deflectors 13 and 14. The distance "a" is same as the distance between the axis of the beams 55 and 56. Referring to FIG. 1 and FIG. 2, the distance "b" from the center of the acoustic crystals of the acousto optic deflectors to the beam splitter 20 is equal to the distance between the beam splitter 20 and the optical window of the photo detector 30.

This mechanism for positioning the acousto optic deflectors and other lenses is to make the interference beam strike the photo detector 30 at the same point at all the scan point locations as shown in FIG. 2. Also the measuring and reference beams interfere automatically at all the scan points when the measuring and reference beams are interfered at one specific scan point.

The working principle of the scan lens is as shown in FIG. 2. The scanning beam 58 comes to focus along a plane on the target surface at all the scan points and on reflection, traces the same path.

Figure 3:
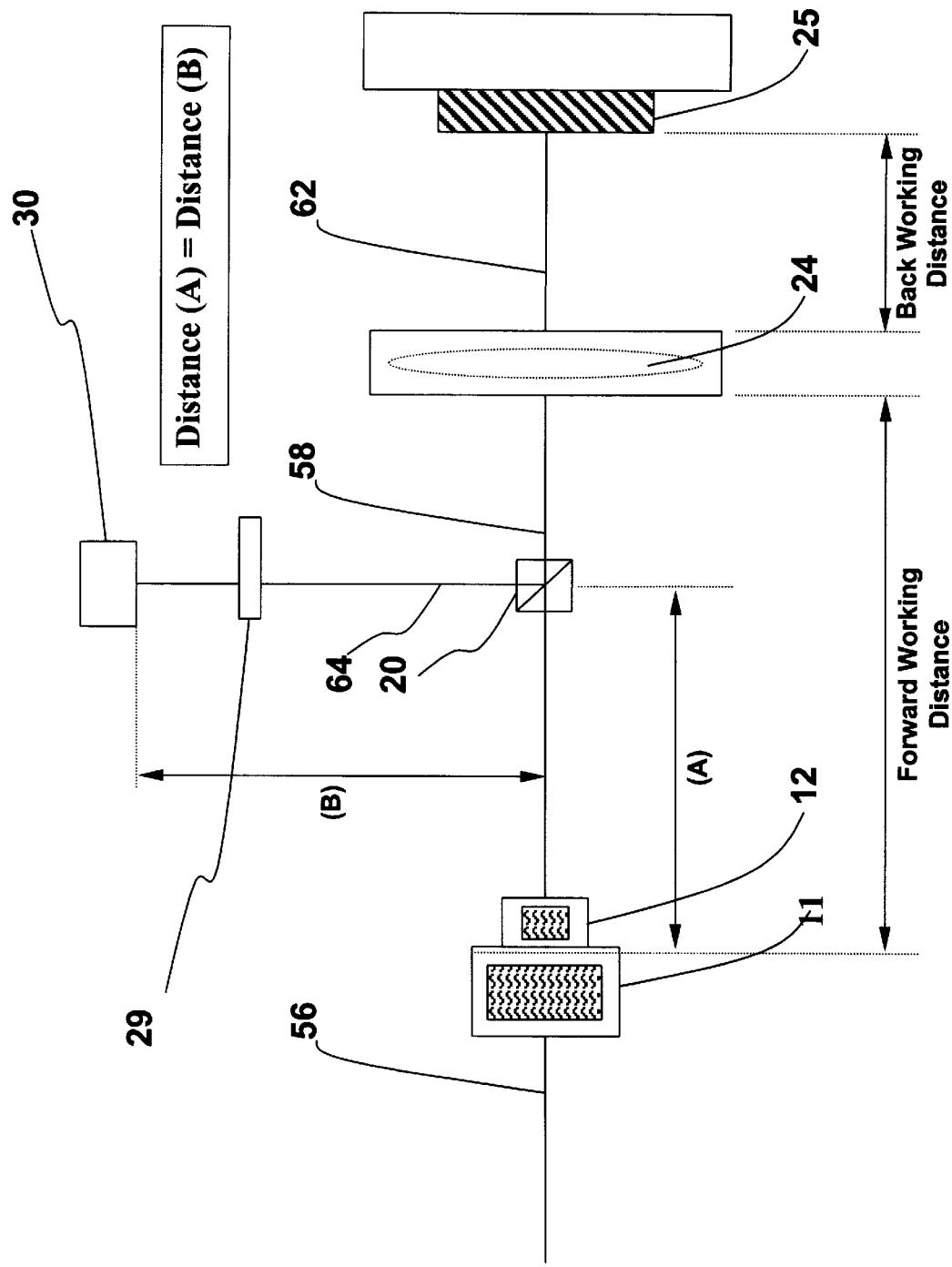
FIG. 3 is a drawing showing the position of the scanning lens with respect to the target surface and the acousto optic deflector.

Referring to the FIG. 3, the positioning of scanning lens 24, which is preferably a telecentric lens, F-theta lens, confocal microscopy lens is an important factor. The scanning lens 24 is positioned such that the forward working distance of the scanning lens 24 is preferably the distance from the lens housing of the lens and the in-between the exit face of the acousto optic crystal in acousto optic deflector 11 and the exit face of the acoustic crystal in acousto optic deflector 12, where the lens 24 has its best performance (as shown in FIG. 3). The scanning lens 24 is also preferably positioned at a distance from the target or object surface called the back working distance of the scanning lens 24 so that the laser beam is focused on the work surface. The back working distance of the scanning lens 24 is preferably the distance from the target surface to the output side of the lens housing of lens 24.

In order to obtain a smaller spot size at the focal point of the scanning lens 24, the diameter of the input beam 58 is preferably larger. In other words, the larger the diameter of the input beam 58 to the scanning lens 24, the smaller will be the focused spot size. The beam filtering mechanism using the spatial filter and the slot or diaphragm disclosed before may result in a smaller spot size (obtained by the scanning lens 24) by improving the quality of the beam.

Figure 4:
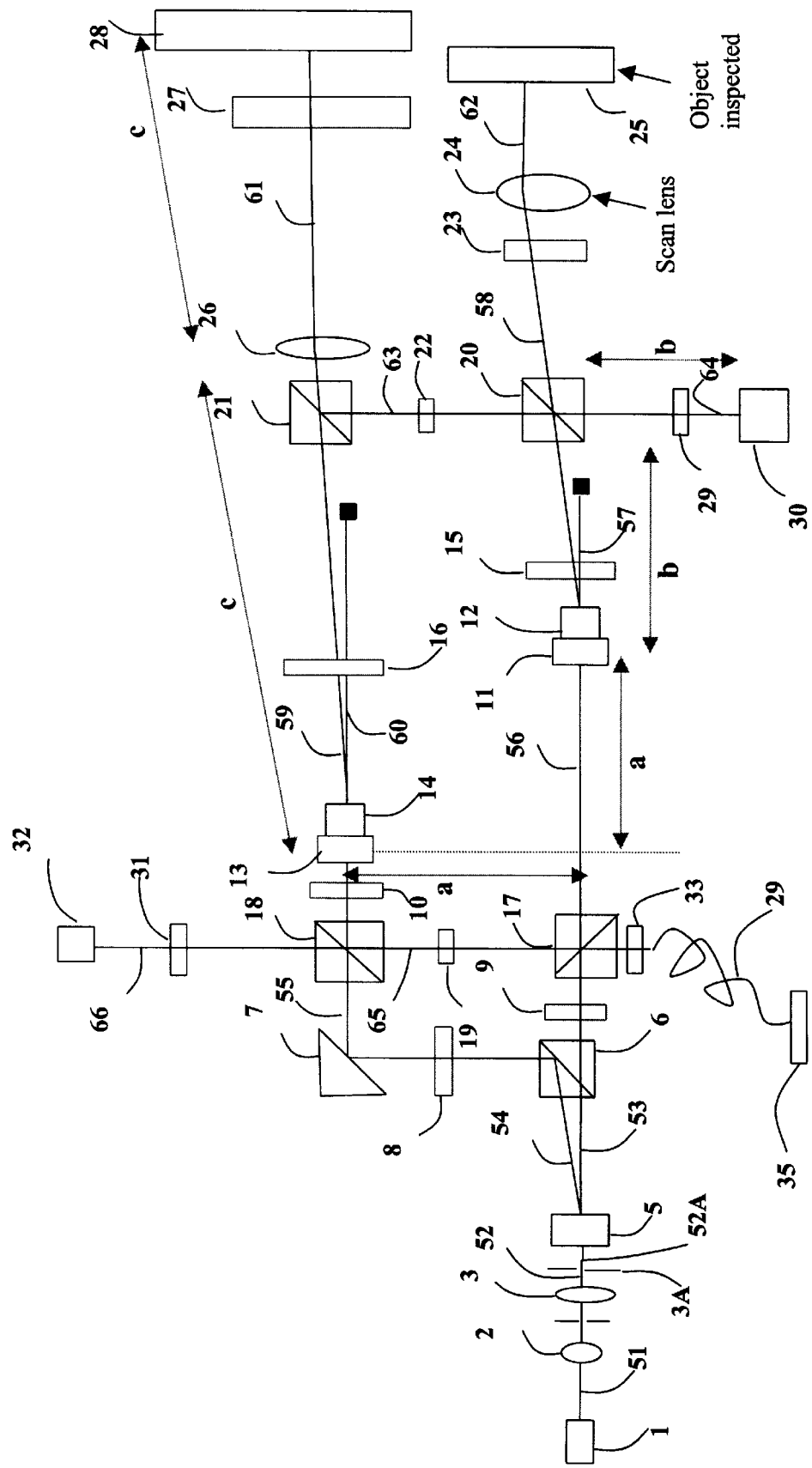
FIG. 4 is a modified optical lay out for obtaining the reference interference signal from the from the beams to the acousto optic deflectors.

The reference interference signal can also be obtained by altering the optical layout of the system as shown in FIG. 4. Instead of interfering the zero order beams from the acousto optic deflectors 12 and 14, the zero and first order beams from the acousto optic modulator 5 is made to interfere in the same manner as before. The wave plates 8 and 9, which are preferably half wave plates, are rotated such that a fraction of the laser beams 55 and 53 are reflected by the beam splitters 17 and 18 and are made to interfere as described before. The reference photo detector 32 captures the interference signal. The zero order beams from the acousto optic deflectors 14 and 12 are blocked by a blocking means 80 and 81.

Figure 5:
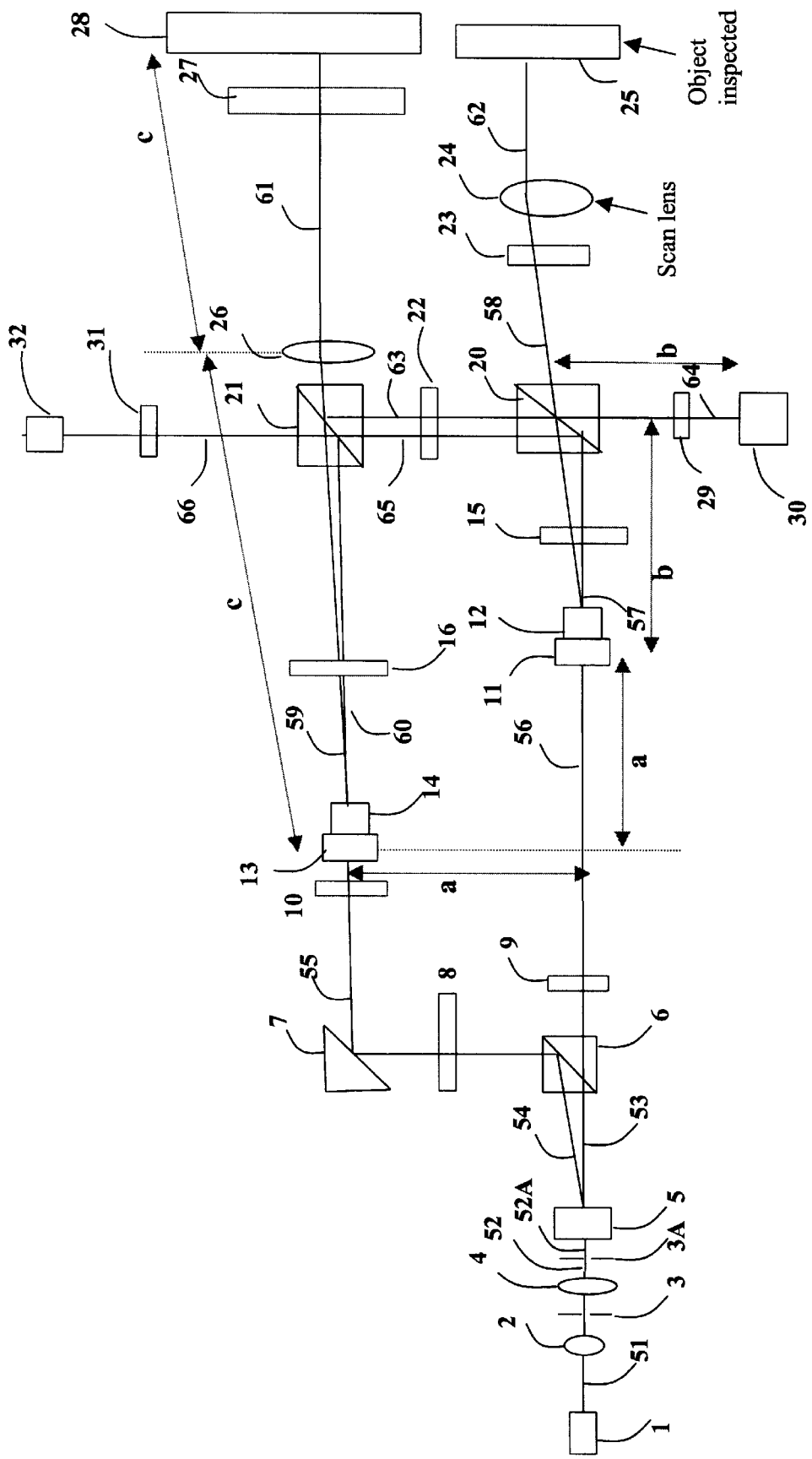
FIG. 5 is a modified optical lay out for obtaining the measurement and the reference interference signal using common optical components to minimize the error.

Further modification of the present embodiment is the use of common beam splitter to obtain the measurement and reference interference signal. Referring to FIG. 5, common beam splitters 21 and 20 are used to produce the measuring and reference interference signal to the photo detectors 30 and 32. This leads to a reduction in the error of the measured result.

Second Embodiment of the Present Invention

The second embodiment of the present invention is to measure the flying-height, i.e., the relative height between the slider head and the disk surface, while the disk is rotating. The optical system and the operating principle is the same as in the first embodiment but has some modification to the optical layout to suit the application as shown in FIG. 6.

The reference optical path and the interference mechanism of the zero order beams 57 and 60 from the acousto optic deflectors 12 and 14 are the same as in the first embodiment. The measuring beams, i.e., the first order scanning beams 58 and 59 from the acousto optic deflectors 12 and 14, take a different optical path as shown in FIG. 6.

Figure 6:
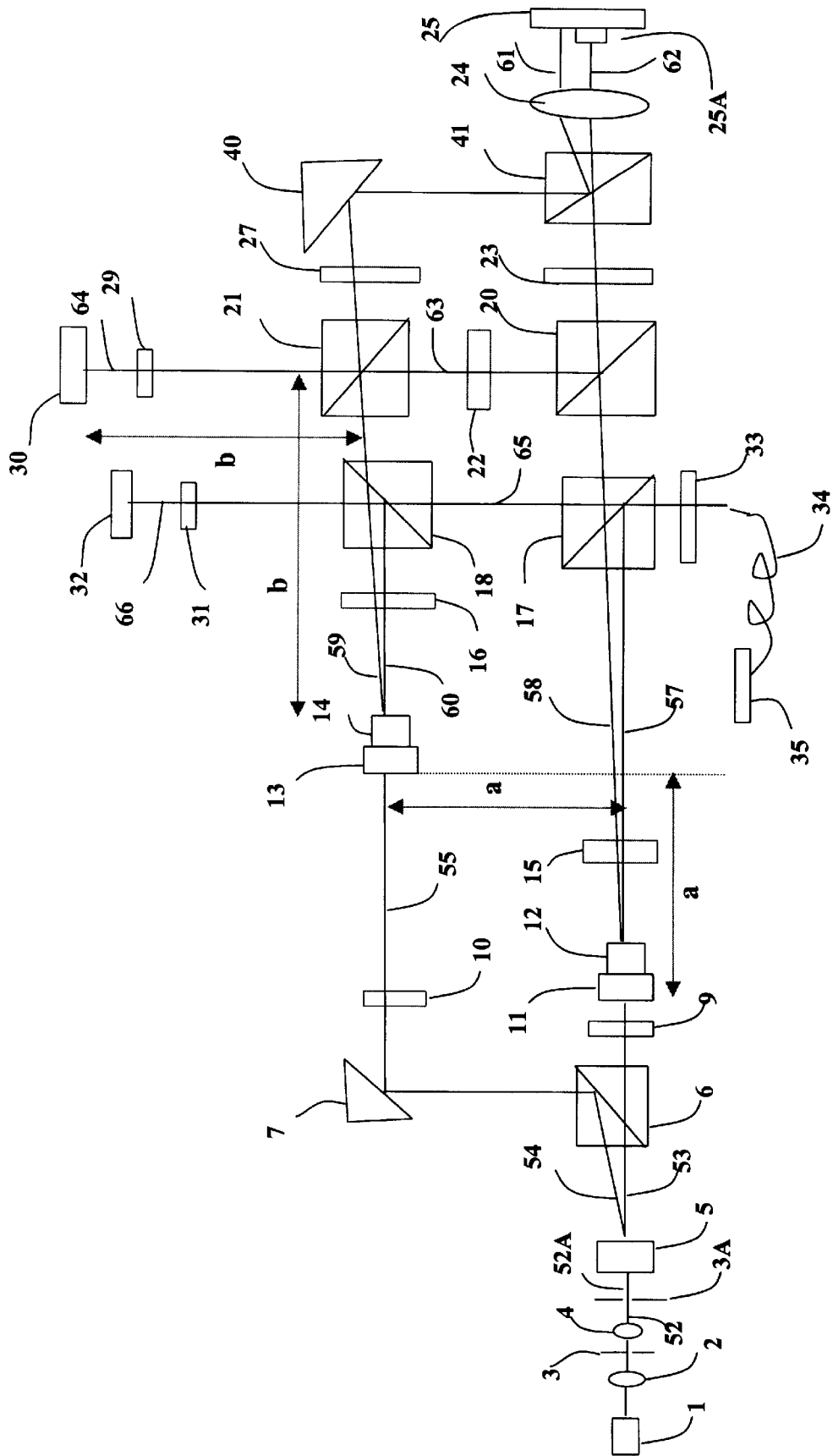
FIG. 6 is a drawing showing the optical system for flying height measurement in hard disk drive.

Referring to FIG. 6, the first order scanning beam 58 from the acousto optic deflector 12 passes through the beam splitters 17 and 20, and then through a wave plate 23. The beam then passes through a beam splitter 41 and is focused on to the slider head surface 25A by the scanning lens 24. The first order-scanning beam 59 from the acousto optic deflector 14 passes through the beam splitters 18 and 21. The beam then passes through a wave plate 27 and is deflected by a right angle prism or a mirror 40 on to the beam splitter 41. The beam is then deflected by the beam splitter 41 and is focused on to the disk surface 25 by the scanning lens 24. The optical systems are aligned to make the beams 61 and 62 parallel to each other.

The beam 62 on reflection from the surface of the slider head traces its original path and is deflected by the beam splitter 20. The deflected beam passes through the wave plate 22, which is preferably a half wave plate and then through the beam splitter 21. Similarly, the beam 61 on reflection from the surface of the disk 25 traces its original path and is deflected by the beam splitter 21. The two beams reflected from the surface of the slider head 25A and the disk 25 are caused to interfere by the polarizer 29. The interference signal is captured by the photo detector 30, which acts as the measuring signal.

Figure 7:
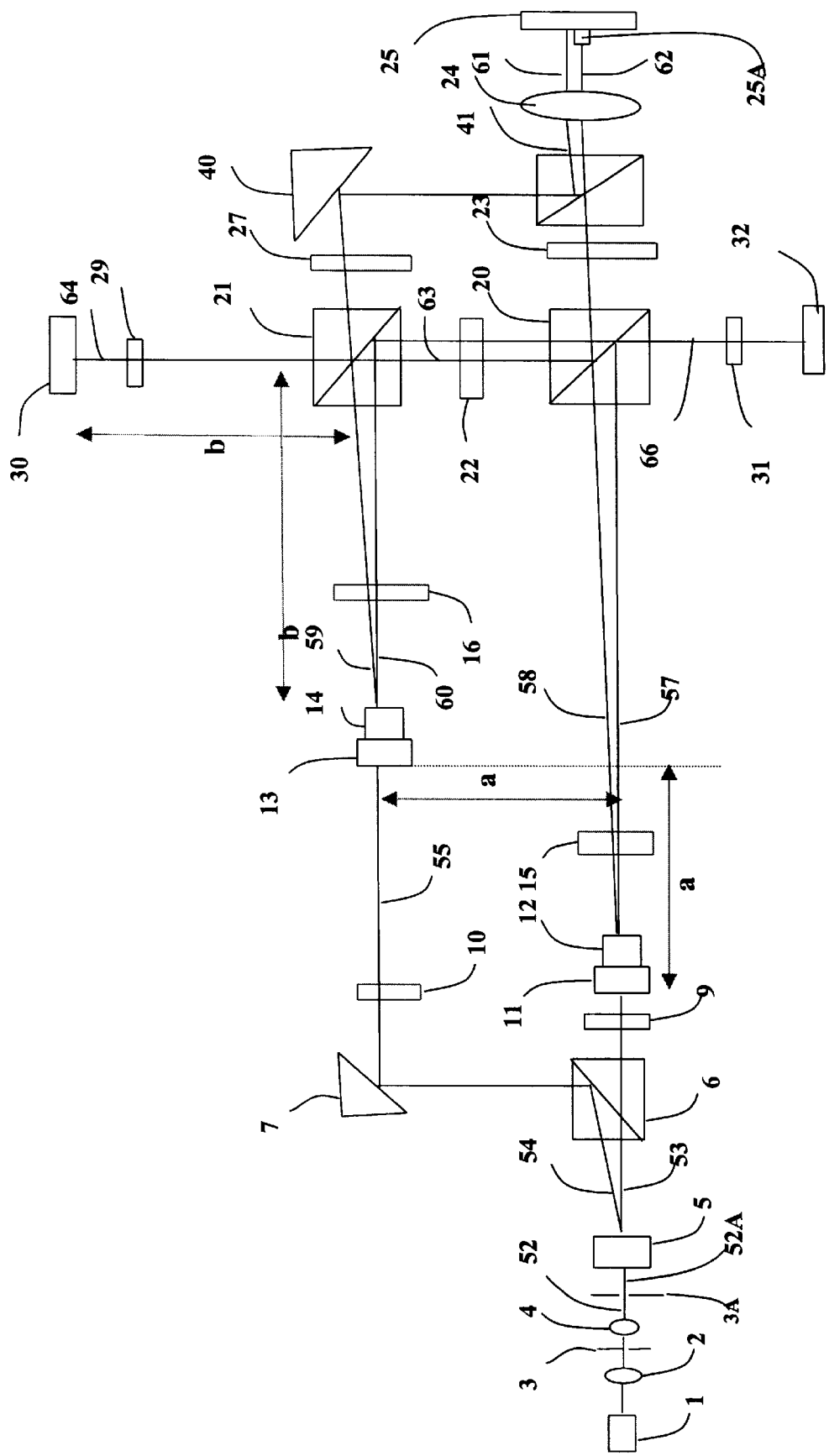
FIG. 7 is a modified optical lay out for obtaining the measurement and the reference interference signal using common optical components to minimize the error for flying height measurement in hard disk drive.

Referring to FIG. 7 the optical system is further modified to obtain the measuring and reference interference signal using the common beam splitter 20 and 21 as in the previous embodiment.

Third Embodiment of the Present Invention

Figure 8:
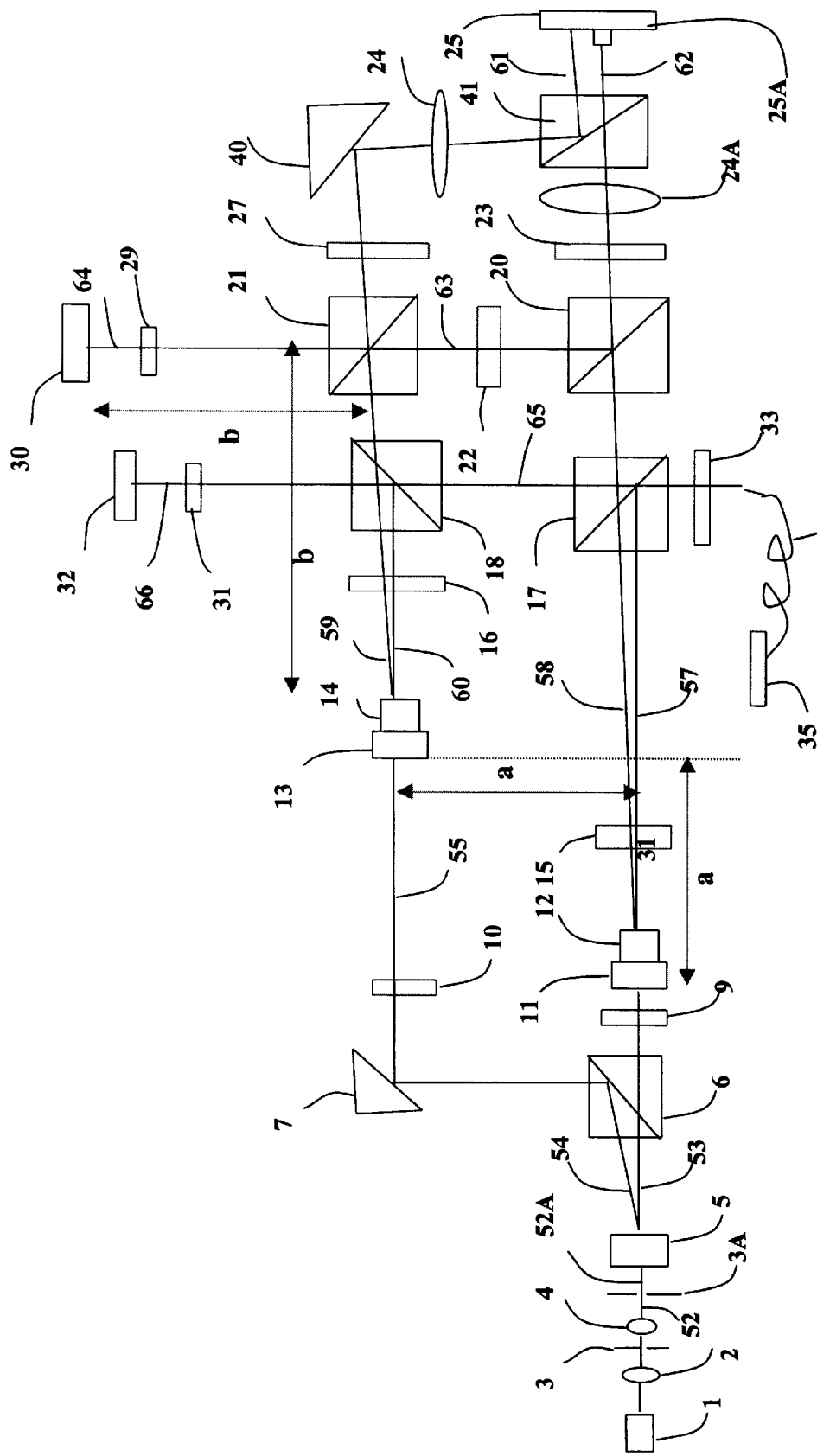
FIG. 8 is a drawing showing the optical layout for the measurement of flying height of hard disk drive by using two scanning lenses.
Figure 9:
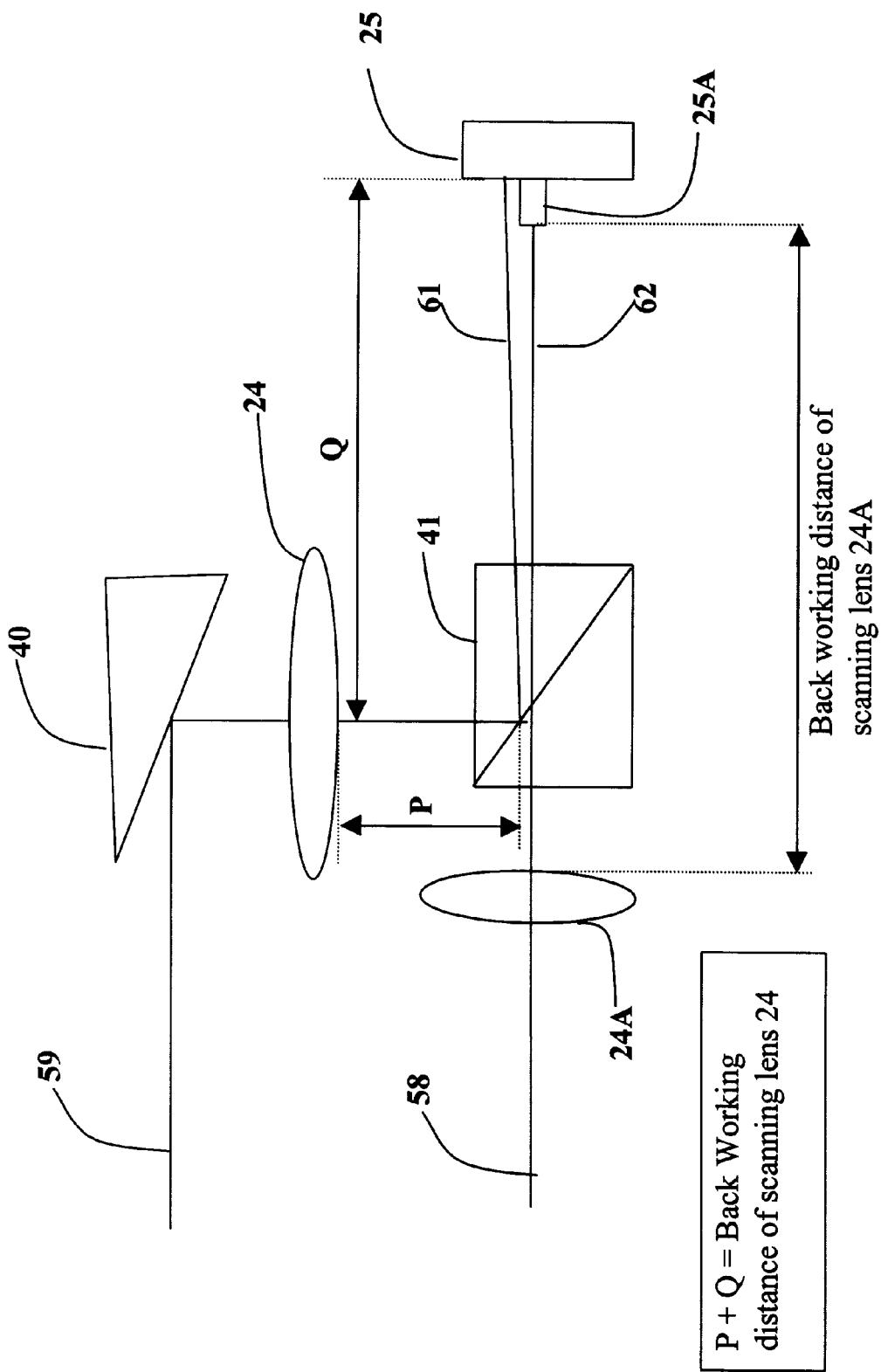
FIG. 9 is a drawing showing the positioning of the two scanning lenses in the third embodiment of the present invention.

The third embodiment of the present invention is to measure the flying height using two scanning lenses in the optical layout as shown in FIG. 8. The surface of the slider head 25A and of the disk 25 are not at the same distance from the scanning lens and hence the laser beam cannot be focused on both the slider head and disk surface. Hence the spot of the focused beam on the slider head 25A and the disk surface 25 will be of different size. This will lead to inaccuracy in relation to the measurement area at each scan point. In order to overcome this error, two scanning lenses are used in the present invention. Referring to FIG. 9, the scanning lens 24 is placed between the deflecting mirror 40 and the beam splitter 41. Also scanning lens 24A is placed before the beam splitter 41. The scanning lens 24 is positioned such that the distance of the disk surface 25 from the scanning lens 24 is the back working distance of the scanning lens. Also the scanning lens 24A is positioned such that the distance of the slider head surface 25A from the scanning lens 24A is the back working distance of the scanning lens 24A. With this method, beams 61 and 62 will focus on the surface of the disk and of the slider head, respectively. The specification of the scanning lenses 24 and 24A is such that the focused beam spot size at the focal point of the scanning lens is the same for both lenses.

Figure 10:
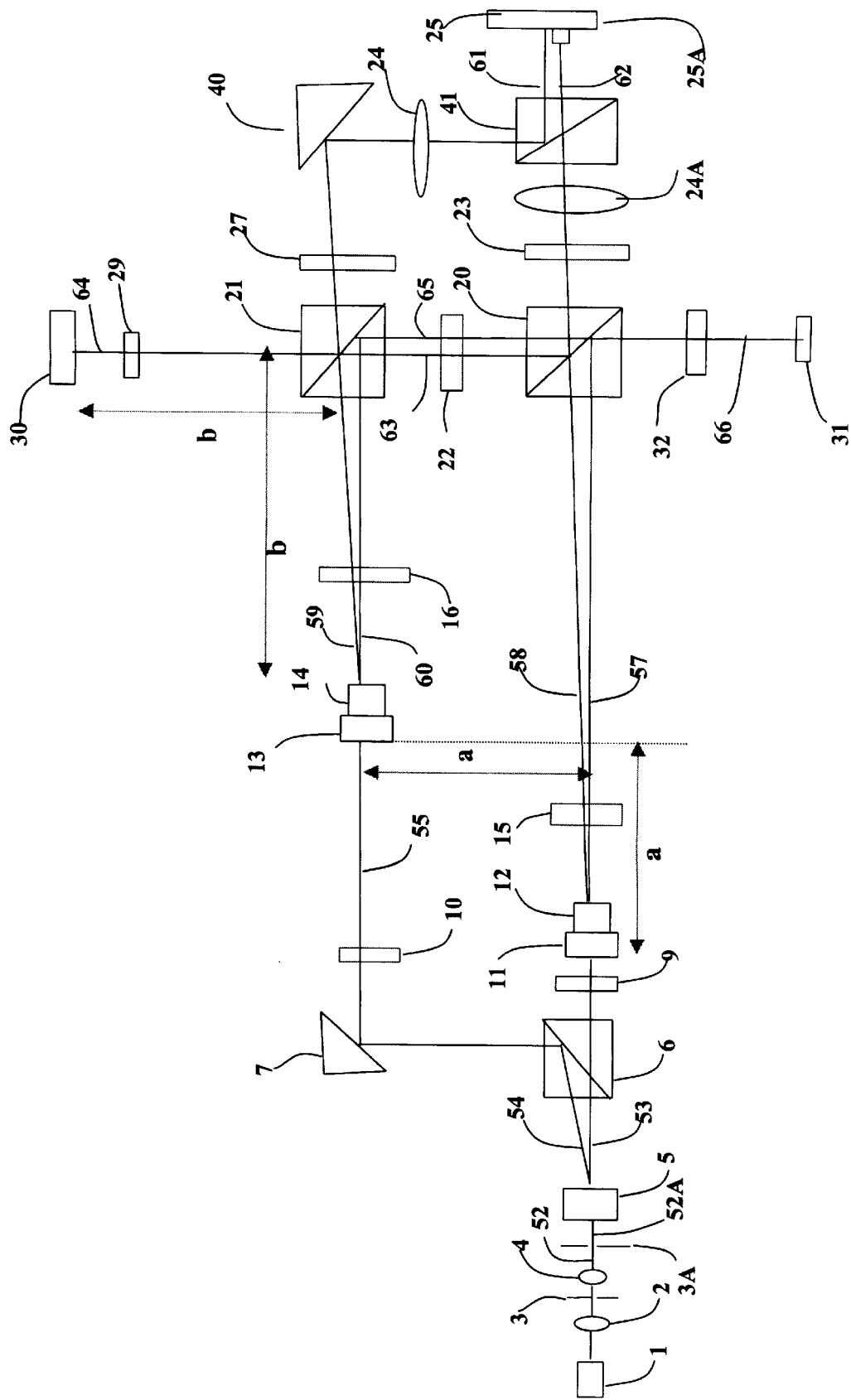
FIG. 10 is a modified optical lay out for obtaining the measurement and the reference interference signal using common optical components to minimize the error for flying height measurement in hard disk drive using two scanning lenses as in the first embodiment of the present invention.

Referring to FIG. 10, the optical system is further modified to obtain the measuring and reference interference signal using the common beam splitters 20 and 21 as in the first embodiment.

For all the embodiments of the present invention a spherical concave reflector can replace the reflecting mirror 28, where the achromatic lens 26 is eliminated. The spherical concave reflector is placed at a distance equal to its radius of curvature or twice its focal length from the center of the acousto optic deflectors 13 and 14. This process will lead to reflection of the scanning beam from the spherical concave reflector in the same path as the input-scanning beam. This will result in a reduction of optical components.

While the preferred embodiment has been disclosed, obvious modifications can be made therein without departing from the spirit and scope of the invention as defined in the following claims.

What is claimed is:

1. An acousto optic scanning laser vibrometer for measuring a dynamic parameter of an object comprising:

a coherent laser beam source of single wavelength and of stabilized frequency, which is split into two orthogonal polarized beams, the first polarized beam striking a surface of an object of investigation and being reflected, the second polarized beam impinging on a reference surface and being reflected, wherein at least one acousto optic deflector is used for scanning the first polarized beam along a measuring path and for scanning the second polarized beam along a reference path;

means for combining the beam reflected from the surface of the object of investigation and the beam from the reference surface and causing them to interfere;

two photodetectors, at least one photodetector being located at the point of interference, having output signals that are input to a signal processor to obtain the dynamic parameter information; and means for providing the information on the dynamic parameters of the object under investigation.

2. An apparatus for measuring the dynamic characteristics of an object in accordance with claim 1 which further includes:

at least two focusing lenses, disposed in front of the coherent laser source and positioned at a distance equal to the sum of the focal length of the two lenses; and a slot positioned at the focal point of the first focusing lens of diameter 1–1.5 times the diameter of the portion of the laser beam at which the beam intensity becomes $1/e^2$ of its peak intensity at its focal point;

wherein the succeeding focusing lens is positioned at a distance equal to its focal length from the slot.

3. An apparatus for measuring the dynamic parameters of an object in accordance with claim 2 which further includes means for expanding the diameter of the laser beam by having focusing lenses with different focal lengths, wherein the expansion ratio of the laser beam diameter is given by =b/a where "a" is the focal length of the preceding focusing lens and "b" is the focal length of the succeeding focusing or collimating lens.

4. An apparatus for measuring the dynamic parameters of an object in accordance with claim 3 which further includes means to further enhance the beam quality comprising a second slot of diameter of 1–1.5 times the diameter of the laser beam at which its intensity is $1/e^2$ of its peak intensity.

5. An apparatus for measuring the dynamic parameters of an object in accordance with claim 3 which further includes means for scanning the beam in two axes comprising:

at least two acousto optic deflectors for X-axis and Y-axis deflection in the measurement path; and at least two acousto optic deflectors for X-axis and Y-axis deflection in the reference path.

6. An apparatus for measuring the dynamic parameters of an object in accordance with claim 5 wherein a zero order beam of the acousto optic deflector is captured by at least one of the photodetectors which is a reference photodetector.

7. An apparatus for measuring the dynamic parameters of an object in accordance with claim 6 wherein a first order beam of the acousto optic deflector is captured by the reference photodetector.

8. An apparatus for measuring the dynamic parameters of an object in accordance with claim 7 which further includes means for focusing the laser beam onto the object comprising:

a scanning lens which can be a F-theta lens or telecentric lens or confocal microscopy lens to focus one of the polarized beams; and means for positioning the scanning lens.

9. An apparatus for measuring the dynamic parameters of an object in accordance with claim 8 wherein the beams in the reference and measuring paths interfere automatically at all scanning points.

10. An apparatus for measuring the dynamic parameters of an object in accordance with claim 9 wherein one of the photodetectors is a stationary photodetector.

11. An apparatus for measuring the dynamic parameters of an object in accordance with claim 9 which further includes means for control the scanning angle, scanning resolution and the scanning speed of the scanning beam onto the surface of the object.

12. An apparatus for measuring the dynamic parameters of an object in accordance with claim 10 wherein the dynamic parameters include flying height information.

13. An apparatus for measuring the dynamic parameters of an object in accordance with claim 12 wherein the dynamic parameters include the relative vibration between two objects.

14. An apparatus for measuring the dynamic parameters of an object in accordance with claim 13 wherein the flying height information is measured using an independent scanning lens.

15. An apparatus for measuring the dynamic parameters of an object in accordance with claim 13 wherein the dynamic parameters include the relative height between two objects.

16. An apparatus for measuring the dynamic parameters of an object in accordance with claim 13 which further includes an achromatic lens or focusing lens in front of the acousto optic deflector.

17. An apparatus for measuring the dynamic parameters of an object in accordance with claim 13 which further includes a spherical concave reflector in the reference path.

18. A method of using an acousto optic scanning laser vibrometer for measuring a dynamic parameter of an object comprising the steps of:

generating a coherent laser beam of a single wavelength and of stabilized frequency, which is split into two orthogonal polarized beams, the first polarized beam striking a surface of an object of investigation and being reflected, the second polarized beam impinging on a reference surface and being reflected, wherein at least one acousto optic deflector is used for scanning the first polarized beam along a measuring path and for scanning the second polarized beam along a reference path;

combining the beam reflected from the surface of the object of investigation and the beam from the reference surface and causing them to interfere;

locating two photodetectors, at least one of the photodetectors being located at the point of interference, the photodetectors having output signals that are input to a signal processor to obtain the dynamic parameter information providing information; and providing the information on the dynamic parameters of the object under investigation.

19. A method for measuring the dynamic characteristics of an object in accordance with claim 18 which further includes:

positioning at least two focusing lenses, disposed in front of the coherent laser source, at a distance equal to the sum of the focal length of the two lenses; and positioning a slot at the focal point of the first focusing lens of diameter 1–1.5 times the diameter of the portion of the laser beam at which the beam intensity becomes $1/e^2$ of its peak intensity at its focal point;

wherein the succeeding focusing lens is positioned at a distance equal to its focal length from the slot.

20. A method for measuring the dynamic parameters of a object in accordance with claim 19 which further includes expanding the diameter of the laser beam by having different focal lengths, wherein the expansion ratio of the laser beam diameter is given by =b/a where "a" is the focal length of the preceding focusing or collimating lens and "b" is the focal length of the succeeding or collimating lens.

21. A method for measuring the dynamic parameters of an object in accordance with claim 20 which further includes enhancing the beam quality with a second slot of diameter of 1–1.5 times the diameter of the laser beam at which its intensity is $1/e^2$ of its peak intensity.

22. A method for measuring the dynamic parameters of an object in accordance with claim 20 which further includes scanning the beam in two axes comprising:

positioning at least two acousto optic deflectors for X-axis and Y-axis deflection in the measurement path; and positioning at least two acousto optic deflectors for X-axis and Y-axis deflection in the reference path.

23. A method for measuring the dynamic parameters of an object in accordance with claim 22 wherein a zero order beam of the acousto optic deflector is captured by at least one of the photodetectors which is a reference photodetector.

24. A method for measuring the dynamic parameters of an object in accordance with claim 23 wherein a first order beam of the acousto optic deflector is captured by the reference photodetector.

25. A method for measuring the dynamic parameters of an object in accordance with claim 24 which further includes focusing the laser beam onto the object comprising the step of:

positioning a scanning lens which can be a F-theta lens or telecentric lens or confocal microscopy lens to focus one of the polarized beams.

26. A method for measuring the dynamic parameters of an object in accordance with claim 24 wherein the beams in the reference and measuring paths interfere automatically at all scanning points.

27. A method for measuring the dynamic parameters of an object in accordance with claim 26 wherein the beams in the reference and measuring paths interfere at the stationary photodetector.

28. A method for measuring the dynamic parameters of an object in accordance with claim 26 which further includes controlling the scanning angle, scanning resolution and the scanning speed of the scanning beam onto the surface of the object.

29. A method for measuring the dynamic parameters of an object in accordance with claim 27 wherein the dynamic parameters include flying height information.

30. A method for measuring the dynamic parameters of an object in accordance with claim 29 wherein the dynamic parameters include the relative vibration between two objects.

31. A method for measuring the dynamic parameters of an object in accordance with claim 30 wherein the flying height information is measured using an independent scanning lens.

32. A method for measuring the dynamic parameters of an object in accordance with claim 30 wherein the dynamic parameters include the relative height between two objects.

33. A method for measuring the dynamic parameters of an object in accordance with claim 30 which further includes disposing an achromatic lens or focusing lens in front of the acousto optic deflector.

34. A method for measuring the dynamic parameters of an object in accordance with claim 30 which further includes positioning a spherical concave reflector in the reference path.

\* \* \* \* \*